July 7, 1959     J. F. PAULSEN     2,893,665
RESILIENT SUSPENSION DEVICES
Filed April 23, 1954     3 Sheets-Sheet 1

INVENTOR
JEAN FELIX PAULSEN,
BY
ATTORNEY

July 7, 1959   J. F. PAULSEN   2,893,665
RESILIENT SUSPENSION DEVICES
Filed April 23, 1954   3 Sheets-Sheet 2
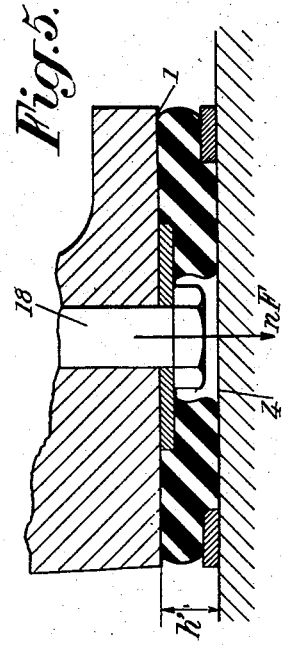
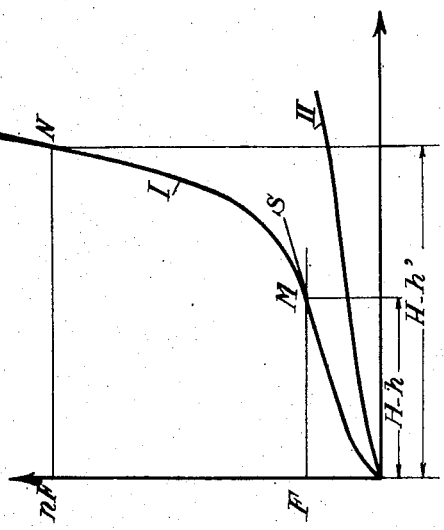
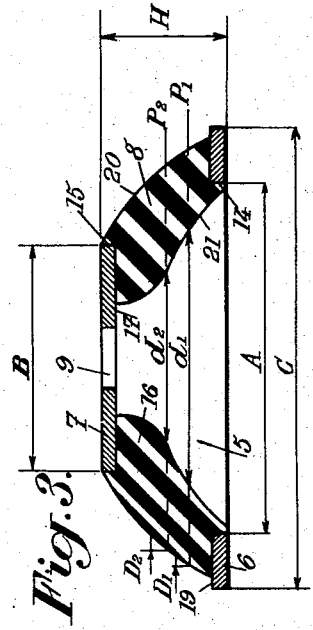
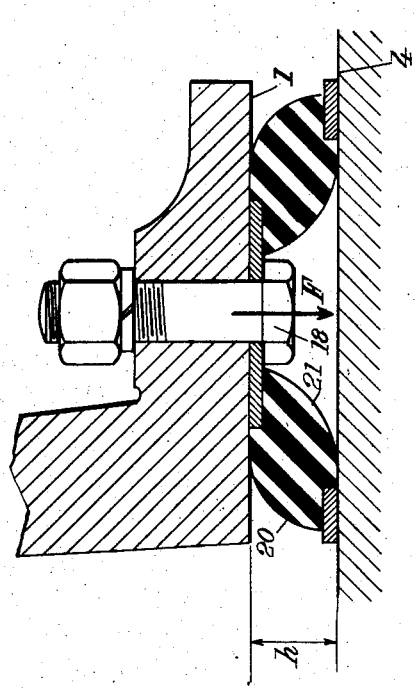
INVENTOR
JEAN FELIX PAULSEN,
BY
Robert B Pearson
ATTORNEY July 7, 1959  J. F. PAULSEN  2,893,665
RESILIENT SUSPENSION DEVICES
Filed April 23, 1954  3 Sheets-Sheet 3

INVENTOR
JEAN FELIX PAULSEN,
BY
Robert B. Ransom
ATTORNEY

United States Patent Office 2,893,665
Patented July 7, 1959

2,893,665

RESILIENT SUSPENSION DEVICES

Jean Felix Paulsen, Paris, France, assignor to Société Luxembourgeoise de Brevets et de Participations Lubrepa, Luxemburg, Luxemburg Application April 23, 1954, Serial No. 425,218

Claims priority, application France April 25, 1953

7 Claims. (Cl. 248—24)

The present invention relates to resilient suspension devices which are intended constantly to undergo static forces and loads in a direction which will be hereinafter called "normal."

The object of my invention is to provide a device of this kind of a dimension relatively small in said normal direction and having a flexibility which: in this normal direction is high as long as the device is subjected to said static force but quickly decreases when increasing forces are added to said static force so that the total force thus applied to the device becomes equal to possibly several times said static force, and in directions at right angles to said normal direction has a high flexibility (called tangential flexibility) under the effect of all forces or torques, either periodic or accidental.

Preferred embodiments of my invention will be hereinafter described with reference to the accompanying drawings, given merely by way of example, and in which:

Fig. 3 is a sectional view corresponding to Fig. 2.

Figs. 4 and 5 are sectional views similar to Fig. 3 showing the device in the shape it assumes under the effect of a static load and on an overload respectively.

Fig. 6 shows explanatory curves.

Figure 1:
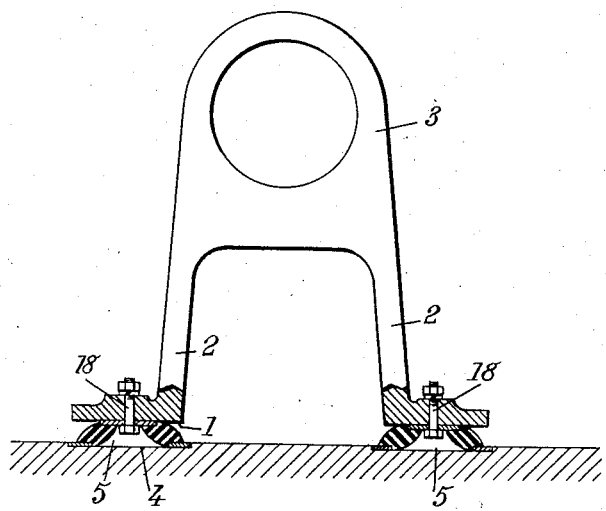
Fig. 1 is an elevational view, with parts cut away, of a machine mounted on suspension devices according to my invention.

In the following description it will be supposed, by way of example, that a suspension device according to my invention is to be interposed between two flat parallel faces relatively close to each other and such as the under face 1 (Fig. 1) of the feet 2 of a fixed machine 3 and the surface of a floor 4. It should be noted that my invention also applies to the mounting of engines on vehicles and the like.

The suspension device, designated as a whole by reference numeral 5, includes two rigid attaching members constituted by strictly flat parallel plates 6 and 7 (Figs. 2 and 3) between which is interposed an annular mass 8 of a resilient material such as rubber either natural or synthetic.

This resilient mass 8 is so shaped that, in the state of rest, if successive sections thereof are made by planes such as $P_1$, $P_2$, etc., parallel to said plates, this succession of section planes going from the plane of plate 6 to the plane of plate 7, the sections of the inner side surface of annular mass 8 by these planes project (on a projection plane parallel to said plates) successively inside one another; the sections of the outer side surface of annular mass 8 also project successively inside one another; and the smallest section of the outer side surface projects inside the projection of the largest section of the inner side surface.

The shapes of plates 6 and 7 and of annular mass 8 are only subjected to the above mentioned conditions.

However it seems advantageous to give the device the shape of a body of revolution about an axis at right angles to the plates. For this purpose, rigid plate 6 on which is fixed the edge surface of annular mass 8 which is of largest cross section is given the shape of a circular ring the inner diameter A of which is larger than the outer diameter B of the other plate 7. This last mentioned plate 7 is constituted by a circular disc which may be provided with a central hole 9 for the fixation of the device either to a machine or to another similar resilient device.

The diameters $D_1$, $D_2$, etc., of the sections of the external side surface 20 and also the sections $d_1$, $d_2$ of the inner side surface 21, by planes $P_1$, $P_2$, etc., are of decreasing values from plate 6 toward plate 7. Furthermore, the diameter of the smallest section of the outer side surface, which is substantially equal to B, is smaller than the diameter of the largest section of the inner side surface, which is substantially equal to A.

Figure 2:
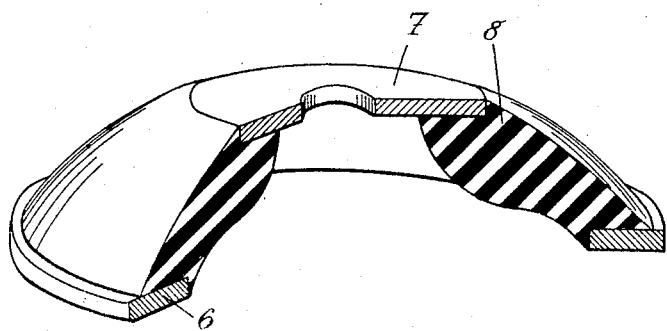
Fig. 2 is a perspective view with parts cut away of a resilient suspension device made according to a first embodiment of my invention.
Figure 8:
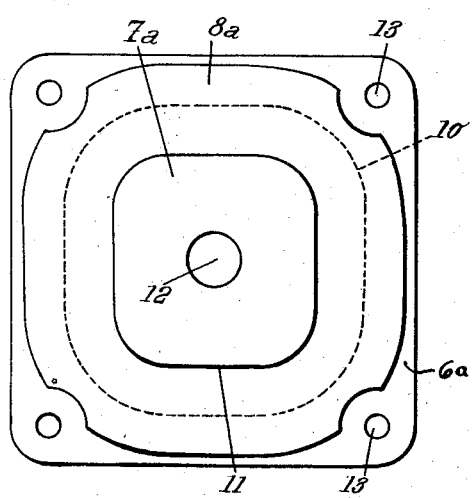
Fig. 8 is a plan view of a suspension device made according to a modification.

However it should be well understood that my invention does not exclude the use of the surfaces which are not of revolution. For instance, Fig. 8 shows a device in which the big plate is in the form of a square (or rectangle) 6a having rounded edges and the same plate is also in the form of a square (or rectangle) 7a having also rounded corners, the annular mass 8a of resilient material being disposed similarly to what is shown by Fig. 2, which means that vertical sections of the device by planes passing through the centers of plates 6a and 7a are similar to the section shown by Fig. 3. The inner edge of plate 6a is shown by the dotted line 10. The smaller plate 7a is provided with a central hole 12. The corners of the larger plate 6a are provided with fixation holes such as 13.

Annular mass 8 (Fig. 3) is assembled to rigid plates 6 and 7 by adhering the ends or edge surfaces of said mass, preferably by vulcanizing, to the corresponding faces of said plates and also to the inner edge 14 of the larger plate and the outer edge 15 of the smaller plate, as shown for instance by Fig. 3.

Supposing by way of example that the suspension device is in the form of a body of revolution, the resilient mass 8 has, in the free state (Figs. 2 and 3), the shape of a kind of vault or dome and its thickness gradually increases from the larger plate toward the smaller plate and this preferably toward the inside. There is thus formed at 16 a portion of smaller radius of curvature (in axial section) whereby an area 17 of the inner face of the smaller plate 7 is left free to receive the head of a bolt 18 (see in particular Fig. 4) or of an analogous fixation member. I may also, in some embodiments, provide on the outer edge of plate 6 a free area 19.

In all cases, the height H of the device in the state of rest is substantially smaller than the outer diameter (or mean transverse dimension) C of the larger plate.

According to my invention, the dimensions of the suspension device and the elasticity of the resilient material are chosen in accordance with the loads to support in such manner that: during a first deformation step, when a static load F of normal direction and value is applied to the device, the height of this device is reduced from value H to value $h$ (Fig. 4), the outer side surface 20 and inner side surface 21 of resilient mass 8 beginning to come gradually into contact respectively with the flat surface 1 of the foot of the machine and with the floor 4 of the support; during a second step of deformation, when overloads are applied the value of which may be equal to several times the static load (that is to say when the overload becomes $nF$ with $n>1$) the outer side surface 20 and inner side surface 21 of the resilient mass 8 gradually come to bear upon flat surfaces 1 and 4 and if the value of the overload is sufficiently big, the resilient annular mass is fully compressed between these two surfaces, as shown by Fig. 5, the height of the device being then reduced to a value $h'$. The cushion of resilient material thus constituted bears over a very large area and its thickness is reduced, whereby it has a high rigidity to compression.

These two steps of deformation are visible on the curve I of Fig. 6 where the reductions of height of the device are plotted in abscissas and the values of the loads or overloads in the normal direction are plotted in ordinates.

The slope of curve I represents the rigidity of the suspension. It will be seen from the curve that, during the first deformation step (for instance at point M), the rigidity of the suspension device is low (the inclination of tangent MS being small), which ensures a low value of the normal frequency of oscillation of the device. During the second step (point N), the rigidity of the suspension device is very high (inclination of tangent NT).

Concerning the tangential elasticity of the suspension device, it will be easily understood (Figs. 3, 4 and 5) that, whatever be the value of the load applied in the normal direction, plates 6 and 7 remain always spaced from one another by a cushion of resilient material of substantial thickness. It is therefore always possible for resilient mass 8 to deform so as to permit relatively important displacements of plates 6 and 7 relative to each other in directions parallel to themselves. In other words, the tangential flexibility remains always higher than the normal elasticity. This property is clearly disclosed by curve II of Fig. 6 where the tangential deformations are plotted in abscissas and the tangential forces in ordinates.

Such a device may be used in different ways.

A single support may be interposed between the ground and every foot 1, as shown by Figs. 1, 4 and 5, the number of suspension devices used in parallel being proportional to the load to be supported. In the case where the suspension device is interposed between a machine and a horizontal bearing surface, the device is advantageously arranged in such manner that it bears on this surface through its larger face.

Figure 7:
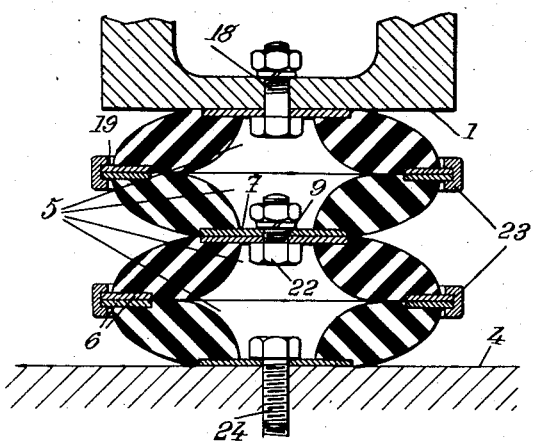
Fig. 7 is a sectional view of a suspension system including a plurality of suspension devices analogous to that of Figs. 2 to 5.

I may also use a plurality of devices stacked on one another, preferably as shown by Fig. 7, that is to say in such manner that the respective similar plates adjoin each other.

The smaller plates 7 are secured together, for instance by means of a central bolt 22 engaged in the holes 9 of these plates, whereas the larger plates may be secured together by means of grooved rings such as 23 applied against the free edges 19 of the plates, the end elementary suspension devices being fixed for instance by bolts such as 18 and 24. This arrangement makes it possible to obtain from standard elementary devices resilient suspensions of any desired characteristics.

A suspension device according to my invention has in the normal direction a high elasticity in the ordinary conditions of operation of the machine, which is desirable from the point of view of vibratory insulation, and a low elasticity in case of accidental and sudden overload, which then prevents the machine from oscillating on its suspension. Furthermore, whatever be the value of the loads applied in the normal direction, the resilient device according to my invention always has a high tangential elasticity, which is also desirable because any angular stress, either periodical or accidental, exerted on the machine is transmitted to the support, not only in the form of a component in the normal direction but also of a tangential component. Finally, as the height of the device under the effect of a normal load $h$ is low, its adaptation to machines previously fixed in rigid fashion does not change the working conditions for the operators of these machines.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A flexible suspension device which comprises, in combination, a first rigid attaching member constituted by a strictly flat plate, a second rigid attaching member constituted by a strictly flat plate parallel to the first one, and an annular mass of a resilient material interposed between the respective faces of said plates that are turned toward each other, the whole of said mass being located between the respective planes of the two other faces of said plates, said mass having two parallel annular edge surfaces adhered to said first mentioned plate faces respectively, each of said annular edge surfaces having an inner outline and an outer outline, the inner outline of the edge surface that is adhered to the first mentioned plate being outboard of the outer outline of the edge surface that is adhered to the other plate and each of the inner and outer side surfaces of said annular mass being vault-shaped, the above characteristics relative to the shape of said annular resilient mass applying to the state of rest thereof, the thickness of the device, from one plate to the other, being substantially smaller than its maximum dimension in the direction parallel to said plates.

2. A flexible suspension device which comprises, in combination, a first rigid attaching member constituted by a stricly flat plate in the form of a circular ring, a second rigid attaching member constituted by a strictly flat plate in the form of a circular ring coaxial with the first one and having inner and outer diameters respectively smaller than the inner and outer diameters of said first plate, said second plate being parallel to the first one, and an annular mass of a resilient material in the form of a body of revolution coaxial with said plates interposed between the respective faces of said plates that are turned toward each other, the whole of said mass being located between the respective planes of the two other faces of said plates, said mass having two parallel annular edge surfaces adhered to said first mentioned plate faces respectively, each of said annular edge surfaces having an inner outline and an outer outline, the inner outline of the edge surface that is adhered to the first mentioned plate being outboard of the outer outline of the edge surface that is adhered to the other plate and each of the inner and outer side surfaces of said annular mass being of decreasing diameter from the first mentioned plate toward the second one, the above characteristics relative to the shape of said annular resilient mass applying to the state of rest thereof, the thickness of the device, from one plate to the other, being substantially smaller than its maximum dimension in the direction parallel to said plates.

3. A flexible suspension device according to claim 1 in which said annular mass is adhered to the inner edge surface of the first mentioned plate and to the outer edge surface of the second mentioned plate.

4. A flexible suspension device according to claim 2 in which said annular mass is adhered to the inner edge surface of the first mentioned plate and to the outer edge surface of the second mentioned plate.

5. A flexible suspension device according to claim 1 in which said annular mass is adhered to the inner edge surface of the first mentioned plate and to the outer edge surface of the second mentioned plate, the second mentioned plate being provided at its center with a hole, and the inner outline of the second mentioned edge surface of said annular mass surrounding the edge of said hole at a substantial distance therefrom.

6. A flexible suspension device according to claim 2 in which said annular mass is adhered to the inner edge surface of the first mentioned plate and to the outer edge surface of the second mentioned plate, the outer diameter of the second mentioned plate being substantially greater than the inner diameter of the second mentioned plate.

7. A flexible suspension device according to claim 1 in which the sections of said annular mass by planes parallel to said plates are quadrangular with rounded edges.

References Cited in the file of this patent

UNITED STATES PATENTS

| | | |
|---|---|---|
| 2,270,336 | Paulus | Jan. 20, 1942 |
| 2,502,313 | Dodge | Mar. 28, 1950 |

FOREIGN PATENTS

| | | |
|---|---|---|
| 865,289 | France | Feb. 17, 1941 |
| 651,932 | Great Britain | Apr. 11, 1951 |